(No Model.) 2 Sheets—Sheet 1.
A. & D. BRAMER.
DISK HARROW OR CULTIVATOR.
No. 556,000. Patented Mar. 10, 1896.
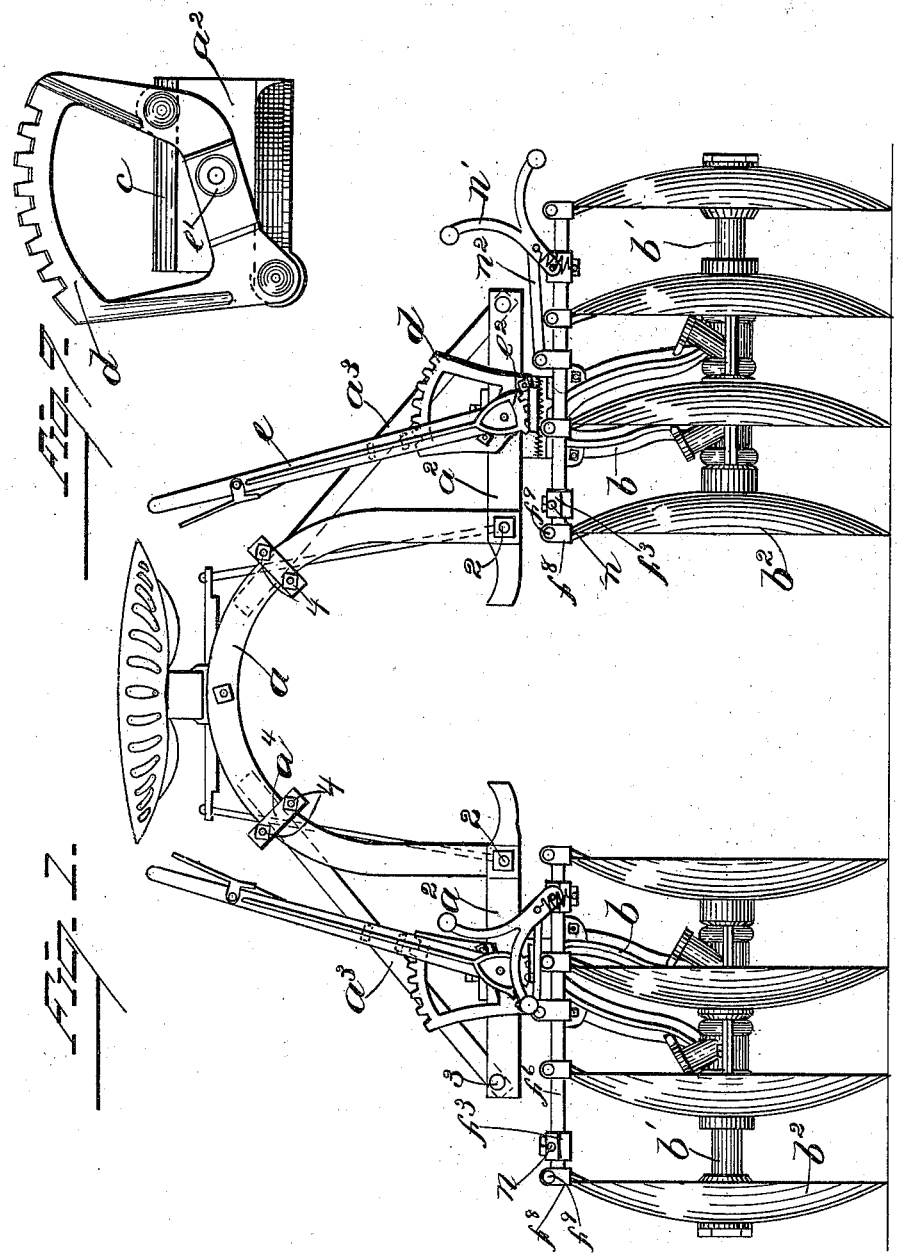
WITNESSES
Charles B. Crocker
F. H. Davis
INVENTORS
Albert Bramer
David Bramer
by R. J. Bryan
Atty

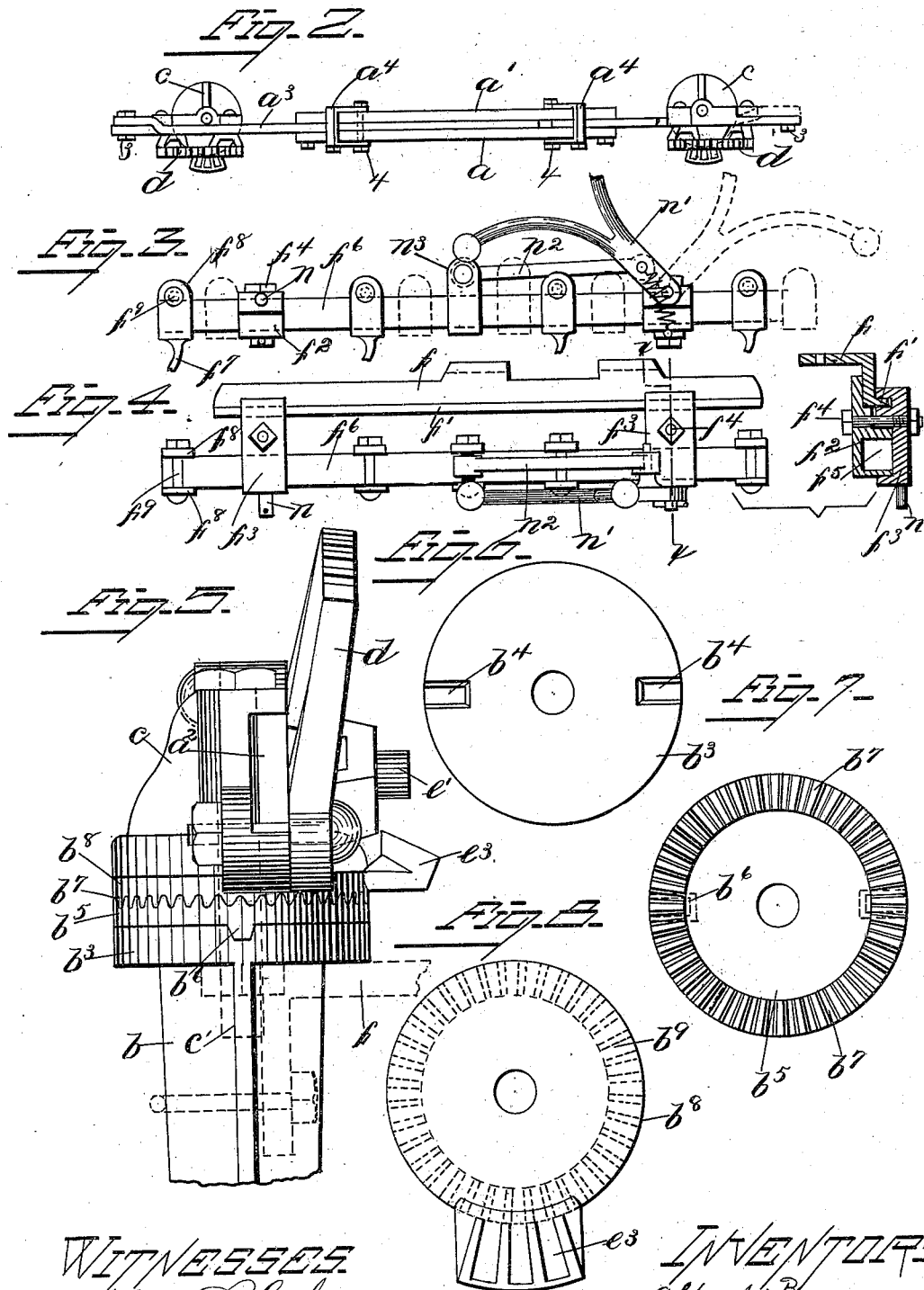

UNITED STATES PATENT OFFICE.

ALBERT BRAMER AND DAVID BRAMER, OF BOSTON, MASSACHUSETTS.

DISK HARROW OR CULTIVATOR.

SPECIFICATION forming part of Letters Patent No. 556,000, dated March 10, 1896.

Application filed June 14, 1895. Serial No. 552,755. (No model.)

*To all whom it may concern:*

Be it known that we, ALBERT BRAMER and DAVID BRAMER, of Boston, in the county of Suffolk and State of Massachusetts, have invented an Improvement in Disk Harrows or Cultivators, of which the following description, in connection with the accompanying drawings, is a specification, like letters and figures on the drawings representing like parts.

This invention relates to disk harrows or cultivators, and has for its object to improve the construction of the mechanism by which the disk gangs are adjusted in horizontal planes or set at different angles to the line of draft; also the means for connecting the disk gangs with the supporting-frame, whereby they may be adjusted laterally or toward and from each other; and also to improve and simplify the construction of the frame which supports the disk gangs, permitting certain angular adjustment of the disk gangs; also to improve the construction of the scraper mechanism; and the invention consists in many details of construction, as will be hereinafter pointed out.

Figure 1 shows a rear side elevation of a disk harrow or cultivator embodying this invention, the pole and its connections being omitted for sake of clearness; Fig. 2, a plan view of the frame which supports the disk gangs; Figs. 3 and 4, details of the scraper mechanism; Fig. 5, a side view of the adjusting device for one of the disk gangs; Figs. 6, 7, and 8, details of parts of said adjusting device; and Fig. 9, details of the means of connecting the disk gangs to the frame.

The frame comprises two arched plates $a\ a'$ made alike and placed one in front of the other with a narrow space between them, and two horizontal arms $a^2\ a^2$ projecting at right angles from the lower ends of said arched plates in opposite ways, they being placed between said plates and secured thereto by bolts 2 or otherwise, and two brace-bars $a^3\ a^3$ connecting the extremities of said horizontal arms $a^2\ a^2$ with said arched plates. The lower ends of said brace-bars $a^3$ are connected to the outer ends of the horizontal arms $a^2$ by bolts 3 or otherwise, and the upper ends of said brace-bars are placed between the arched plates $a\ a'$ and held securely by loop-like clamps $a^4$, which embrace the plates $a\ a'$ and which are held in place thereon by bolts 4, said clamps $a^4$ drawing the plates $a\ a'$ together, and thereby frictionally holding the bars between them. The horizontal bars $a^2\ a^2$ may thus be turned on the bolts 2 as pivots, at different angles, upon loosening the clamps $a^4$ and sliding along the brace-bars.

The disk gangs are made alike, or substantially so, and but one will be described.

A yoke $b$ of suitable form and construction supports the bearing for the gang-shaft $b'$, to which the disks $b^2$ are secured, said yoke having its upper end $b^3$ or crown made substantially flat and preferably circular in shape. (See Figs. 5 and 6.) The flat surface of the crown $b^3$ has formed in it two or more notches or recesses $b^4$.

A circular plate $b^5$, (see Figs. 5 and 7,) preferably of the same diameter as the flat-surfaced crown $b^3$, is placed upon said crown, it having formed upon its under side suitable projections $b^6$ which enter the recesses $b^4$, thereby preventing the plate $b^5$ from turning, except with said flat-surfaced crown, yet its position thereon may be reversed or the yoke $b$ may be reversed with relation to said plate $b^5$. The upper face of the plate $b^5$ has formed upon it, annularly, suitable teeth or serrations $b^7$. Another circular plate, $b^8$, is placed upon the top of the plate $b^7$, it having formed upon its under side, annularly, suitable teeth or serrations $b^9$, adapted to fit between the teeth or serrations formed upon the upper surface of the plate $b^5$, so that when placed upon said plate $b^5$ it will be prevented from turning, except with said plate; yet it may set in many different positions thereon. The plate $b^8$ has on its periphery a radially-projecting toothed flange or segment $e^3$, which extends partially around it—say from forty-five to ninety degrees—it having, say, four or more teeth.

A bracket $c$, having a circular base of substantially the same diameter as the plates $b^5$ and $b^8$, is placed upon the top of said plate $b^8$, and the contacting faces of said base and plate $b^8$ are flat, so that the plate $b^8$ and parts connected thereto may turn freely beneath the bracket. A king-bolt $c'$ passes down through a vertical hole made in said bracket $c$ and through central holes made in the plates $b^8\ b^5$ and flat-surfaced crown $b^3$, and when the nut is turned up the parts are held assembled, said bolt serving as a pivot-pin for the yoke $b$ and disk gang supported thereby. The bracket $c$ is cut away at one side to receive the horizontal arm $a^2$.

A quadrant $d$, having teeth upon its upper edge, is placed against the bracket $c$, crossing the cut-away portion thereof and the arm $a^2$ contained therein, and is secured to said bracket $c$ by bolts 5 6, one above and the other below said arm $a^2$. By securing the quadrant $d$ to the bracket in this manner the bracket will be securely held in place on the arm $a^2$; yet by loosening the bolts 5 6 said bracket may be moved along said arm as desired, thereby adjusting the disk gang back and forth on the arm.

A sector-lever $e$ is mounted on a stud $e'$ projecting from the quadrant $b$, the lower end of which has formed upon it several teeth $e^2$ which engage the teeth $e^3$ on the plate $b^8$, and said sector-lever is locked in its different positions by a hand-operated pawl or detent engaging the teeth of the quadrant $d$, as usual with set levers. By moving the sector-lever back and forth on its pivot $e'$ the plate $b^8$ and parts connected thereto will be turned on the pivot-pin $c$ as a center, thereby adjusting the disk gang angularly to the line of draft.

If it should be desired to move the disk gang more than the limited range of movement of the sector-lever and its co-operating toothed segment $e^3$, the plates $b^5$ and $b^8$ may be separated by loosening the nut on the bolt $c'$ and the plate $b^5$ turned one with relation to the plate $b^8$ any distance desired, after which they may be again clamped together. Also the yoke $b$ may be reversed, if desired, upon loosening the nut on the bolt $c'$. This large range of adjustment of the different parts is of importance in this class of apparatus to accommodate it to the great variety of work to which it may be put.

A plate $f$ (see Figs. 4 and 5) is bolted or otherwise secured to the yoke $b$, it having a lip or flange $f'$, and two clamping-plates $f^2 f^3$, abutting together, embrace the lipped edge of said plate $f$ near one end and are there held secure by bolts $f^4$, or otherwise. One of the clamping-plates—as $f^2$, for instance—is formed with a quadrangular recess $f^5$ to receive a quadrangular scraper-bar $f^6$, said recess being covered or inclosed by the clamping-plate $f^3$ to thereby form a quadrangular guideway for the scraper-bar. Two similarly-constructed clamping-plates embrace the lipped edge of the plate $f$, near the other end, which forms a guideway at such point for the scraper-bar. The scraper-bar is therefore free to slide longitudinally in the guideways provided for it, and owing to its cross-sectional shape cannot rock.

The scrapers $f^7$ of any suitable shape and number are each formed at their upper ends with two ears $f^8 f^8$, which astride the scraper-bar, and bolts $f^9$ pass through said ears, drawing them toward each other and thereby firmly binding the scrapers to the scraper-bar. Such form of scrapers are adjustable along the bar, as desired.

The clamps which form guideways for the scraper-bar, either or both, may have a pivot-pin $n$, which receives upon it a bifurcated foot-lever $n'$, the arms of which project more or less at right angles to each other, so that a right-angular recess is presented between said arms for the foot.

The bifurcated foot-lever $n'$ is connected by a link $n^2$ with the scraper-bar—as, for instance, it may be bolted to a loop or scrap $n^3$, which embraces the scraper-bar and firmly secured thereto by means of a bolt which draws the ends thereof toward each other. By turning the foot-lever on its pivot in one or the other direction the scraper-bar will be correspondingly moved, and the link $n^2$, passing above and below the pivot of the foot-lever, acts to hold the scraper-bar in one or its other extreme position.

The bifurcated foot-lever may be placed upon the pivot-pin of either clamp, as may be desired, and the loop or strap $n^3$ placed on the bar at different points.

This form of scraper mechanism posseses in itself many specific advantages.

We claim—

1. In a disk harrow, a disk gang pivotally connected with a supporting-frame to be adjusted on a vertical axis angularly to the line of draft, and having the toothed segment $e^3$, the sector-lever $e$ the teeth of which engage the teeth of the segment $e^3$, pivot-pin for said sector-lever, and a locking device for holding said sector-lever in its different positions, substantially as described.

2. In a disk harrow or cultivator, the bracket $c$ connected with the frame, rotatable plate beneath it, having the toothed segment $e^3$, the yoke $b$ supporting the disk-gang shaft made reversible on said rotating plate, the pivoted sector-lever $e$, the teeth of which engage the teeth of said segment, and a locking device for said sector-lever for holding it in its different positions, substantially as described.

3. In a disk harrow or cultivator, the bracket $c$ connected with the frame, plates $b^5$, $b^8$, arranged beneath it, the contact-faces of which are toothed for adjustability, the yoke $b$ supporting the disk-gang shaft, center bolt $c'$ for holding the parts assembled which serves as a pivot-pin, the radially-extended toothed segment $e^3$ on the plate $b^8$, pivoted sector-lever, the teeth of which engage the teeth of said segment, and a locking device for holding said sector-lever in its different positions, substantially as described.

4. In a disk harrow or cultivator, yoke $b$ supporting the disk-gang shaft having a flat-surfaced crown $b^3$, provided with recesses $b^4$, plate $b^5$ having upon its under side projections $b^6$ and upon its upper side teeth $b^7$, plate $b^8$ having upon its under side teeth $b^9$ and having its upper side made flat and provided with a radially-extended toothed portion $e^3$, a bracket $c$ embracing the supporting-arm of the frame, center bolt $c'$ for holding the parts assembled and the sector-lever $e$ engaging the toothed part $e^3$ for turning the yoke $b$ on the center bolt as a pivot.

5. In a disk harrow or cultivator, the disk gang, its pivot-pin $c'$, the bracket $c$ through which the pivot-pin passes, said bracket being recessed to receive an arm of the supporting-frame, and the plate $d$ secured to said bracket $c$ crossing the recess therein and thereby frictionally securing the bracket on the arm, pivot-pin $c$ on said plate $d$, sector-lever thereon, the teeth of which engage a toothed segment on the support of the disk-gang shaft, and a latch on said sector-lever which cooperates with teeth formed on said plate $d$, substantially as described.

In testimony whereof we have signed our names to this specification in the presence of two subscribing witnesses.

ALBERT BRAMER.
DAVID BRAMER.

Witnesses:
B. J. NOYES,
C. B. CROCKER.